(12) United States Patent
Clar et al.

(10) Patent No.: US 8,351,684 B2
(45) Date of Patent: Jan. 8, 2013

(54) TERRAIN MAP UPDATING SYSTEM

(75) Inventors: Jean-Jacques Clar, Dunlap, IL (US); Yifeng Lin, Peoria, IL (US); Adam J. Gudat, Chillicothe, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1153 days.

(21) Appl. No.: 12/068,929

(22) Filed: Feb. 13, 2008

(65) Prior Publication Data

US 2009/0202109 A1 Aug. 13, 2009

(51) Int. Cl.
*G06K 9/00* (2006.01)

(52) U.S. Cl. .......................................... 382/154

(58) Field of Classification Search .................. 382/109, 382/103, 154, 113; 701/3
See application file for complete search history.

(56) References Cited

U.S. PATENT DOCUMENTS

| | | |
|---|---|---|
| 5,375,663 A | 12/1994 | Teach |
| 5,493,494 A | 2/1996 | Henderson |
| 5,548,516 A | 8/1996 | Gudat et al. |
| 5,610,815 A | 3/1997 | Gudat et al. |
| 5,631,658 A | 5/1997 | Gudat et al. |
| 5,953,977 A | 9/1999 | Krishna et al. |
| 5,999,866 A | 12/1999 | Kelly et al. |
| 6,024,655 A | 2/2000 | Coffee |
| 6,047,234 A | 4/2000 | Cherveny et al. |
| 6,076,030 A | 6/2000 | Rowe |
| 6,108,949 A | 8/2000 | Singh et al. |
| 6,167,336 A | 12/2000 | Singh et al. |
| 6,201,883 B1 | 3/2001 | Mizui |
| 6,223,110 B1 | 4/2001 | Rowe et al. |
| 6,296,317 B1 | 10/2001 | Ollis et al. |
| 6,363,173 B1 | 3/2002 | Stentz et al. |
| 6,363,632 B1 | 4/2002 | Stentz et al. |
| 6,453,223 B1 | 9/2002 | Kelly et al. |
| 6,526,352 B1 | 2/2003 | Breed et al. |
| 6,608,913 B1 | 8/2003 | Hinton et al. |
| 6,625,135 B1 | 9/2003 | Johnson et al. |
| 6,771,609 B1 | 8/2004 | Gudat et al. |
| 6,952,488 B2 | 10/2005 | Kelly et al. |
| 6,963,662 B1 | 11/2005 | LeClerc et al. |
| 7,068,815 B2 | 6/2006 | Chang et al. |
| 7,151,996 B2 | 12/2006 | Stein |
| 7,603,208 B2 * | 10/2009 | Garceau et al. ................... 701/3 |
| 7,616,828 B2 * | 11/2009 | Rahmes et al. ............... 382/260 |
| 2006/0239537 A1 | 10/2006 | Shragai et al. |

FOREIGN PATENT DOCUMENTS

| | | |
|---|---|---|
| JP | 07-332980 | 12/1995 |
| JP | P2004-198841 | 7/2004 |
| JP | P2005-326944 | 11/2005 |

* cited by examiner

*Primary Examiner* — Claire X Wang

(74) *Attorney, Agent, or Firm* — Finnegan, Henderson, Farabow, Garrett & Dunner LLP

(57) ABSTRACT

A terrain mapping system is disclosed. The system has at least one sensor configured to gather a plurality of current points defining a current surface of a site and a database containing a plurality of previously-gathered points defining a previous surface of the site. The system also has a controller in communication with the at least one sensor. The controller is configured to compare a height of at least one of the plurality of the current points to a height of a corresponding at least one of the plurality of previously-gathered points and to determine if an update to the database is warranted based on the comparison. The controller is further configured to update the database if it is determined that an update is warranted.

25 Claims, 8 Drawing Sheets

TERRAIN MAP UPDATING SYSTEM

TECHNICAL FIELD

The present disclosure relates generally to terrain mapping and, more particularly, to a worksite terrain map updating system.

BACKGROUND

Worksites, such as, for example, mine sites, landfills, quarries, construction sites, etc., commonly undergo geographic alteration by machines and/or workers performing various tasks thereon. For example, at a coal mining site, mounds of coal are continually moved by dozers about the site, onto conveyors, into chutes, etc., to prepare the coal for transport. Likewise, on an excavation site, terrain is altered by digging, grading, leveling, or otherwise preparing the terrain for various uses.

It has become useful to map terrain in some applications. For instance, it is advantageous to map worksite terrain for remotely aiding or controlling excavation, determining progress towards completion of tasks, calculating material ingress and egress, and/or identifying worksite inefficiencies or other trends.

One example of a terrain mapping system is described in U.S. Pat. No. 6,608,913 (the '913 patent) issued to Hinton et al. on Aug. 19, 2003. The '913 patent describes a self-contained mapping and positioning system for use in underground mining applications. Specifically, a survey system including a laser scanner attached to an underground, remotely-operated mining vehicle is disclosed. As the vehicle advances through the mine, the scanner scans the mine. The scanned data is converted into point cloud data representing the surface of the mine. The survey system then stores the point cloud data in a three-dimensional database, which is used to navigate the vehicle through the mine.

Although the survey system of the '913 patent may adequately map the surface of the mine, it may be inefficient. For example, if the mine is surveyed at the same location multiple times, the three-dimensional database may be updated with redundant point cloud data, even if no changes to the mine surface have occurred since the prior scan. In addition, the survey system of the '913 patent may be unable to distinguish the mine surface from other structures in the mine (e.g., another mining vehicle). If scanned, these structures might be incorporated into the three-dimensional database, creating an inaccurate map of the mine terrain.

This disclosure is directed to overcoming one or more of the problems set forth above.

SUMMARY

One aspect of the present disclosure is directed to a terrain mapping system. The system may include at least one sensor configured to gather a plurality of current points defining a current surface of a site and a database containing a plurality of previously-gathered points defining a previous surface of the site. The system may also include a controller in communication with the at least one sensor. The controller may be configured to compare a height of at least one of the plurality of the current points to a height of a corresponding at least one of the plurality of previously-gathered points and to determine if an update to the database is warranted based on the comparison. The controller may be further configured to update the database if it is determined that an update is warranted.

Another aspect of the disclosure is directed to a method of mapping terrain. The method may include gathering a plurality of current points defining a current surface of a site and comparing a height of at least one of the current points to a height of a corresponding at least one of a plurality of previously-gathered points defining a previous surface of the site and stored in a database. The method may also include determining if an update to the database is warranted based on the comparison and updating the database if it is determined that an update is warranted.

Another aspect of the disclosure is directed to another terrain mapping system. The system may include at least one sensor configured to gather a plurality of points defining a surface of a site and a controller in communication with the at least one sensor. The controller may be configured to identify points among the gathered plurality of points that do not define terrain, to filter from the gathered plurality of points the identified points that do not define the terrain of the site, and to generate a map of the terrain based on the filtered gathered plurality of points.

Yet another aspect of the disclosure is directed to another method of mapping terrain. The method may include gathering a plurality of points defining a surface of a site, identifying points among the gathered plurality of points that do not define terrain of the site, and filtering from the gathered plurality of points the identified points that do not define the terrain of the site. The method may further include generating a map of the terrain using the filtered gathered plurality of points.

DETAILED DESCRIPTION

Figure 1:
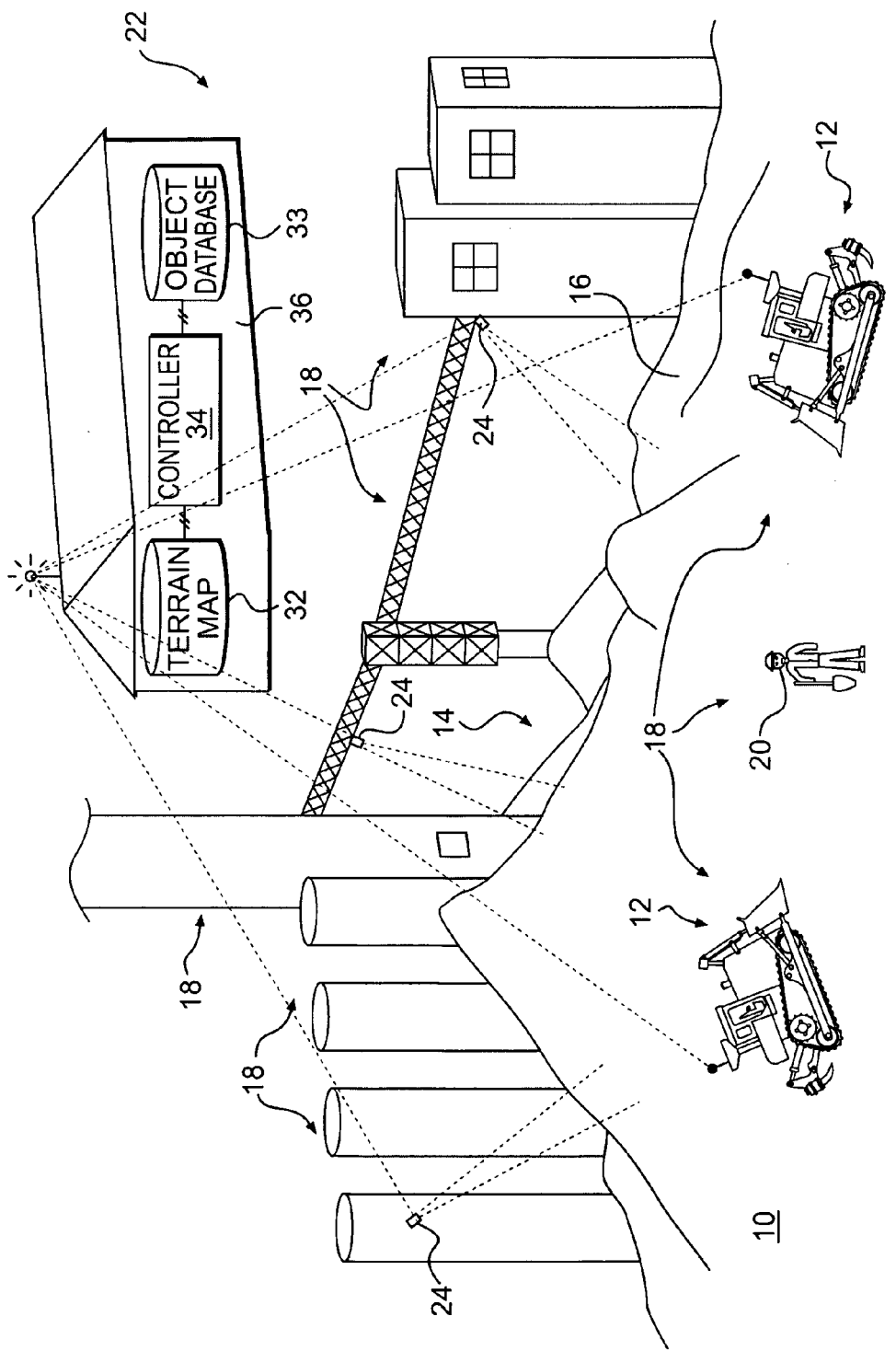
FIG. 1 is a representation of a worksite having an exemplary disclosed terrain mapping system.

FIG. 1 illustrates an exemplary worksite 10. Worksite 10 may be, for example, a mine site, a landfill, a quarry, a construction site, or another type of site on which work or labor is performed. In one embodiment, worksite 10 may undergo geographic alteration due to work performed thereon by one or more machines 12. Machines 12 may perform, for example, mining, material-gathering, excavation, or other geography-altering tasks on worksite 10. Machines 12 may be, for example, excavators, loaders, dozers, motor graders, haul trucks, and/or other types of equipment for performing geography-altering tasks to worksite 10.

The surface 14 of worksite 10 may be characterized by a variety of features. The features may include, for example, the actual worksite terrain 16 and objects 18. Terrain 16 may comprise, soil, rock, ore, mineral deposits, coal, precious metal, lumber, scrap, garbage, or other similar materials. Objects 18 may include infrastructure, such as, for example, conveyors, chutes, lifts, and/or other material transport means; storage, refining, and/or processing facilities; a worksite headquarters or other buildings; and/or other structures or fixtures commonly found on a worksite. Objects 18 may also include machines 12, workers 20, scaffolding, tools, and/or other items that may move about worksite 10 and/or have a transitory presence on worksite 10.

In addition, worksite 10 may include and/or be associated with a terrain mapping system 22 to scan worksite surface 14 and map terrain 16. In the embodiment shown in FIG. 1, system 22 may include one or more sensors 24 a terrain map 32, and an object database 33 in communication with a controller 34. Terrain map 32, object database 33, and/or controller 34 may be included in an off-board system 36 remote from worksite 10. Alternatively or additionally, components of system 22 may be included on one or more of machines 12. Controller 34 may be configured to communicate with sensors 24, with terrain map 32, with object database 33, and with machines 12 on worksite 10 to send, receive, and/or retrieve information relating to operations of system 22.

Sensors 24 may be positioned on and/or mounted to the worksite infrastructure. Alternatively or additionally, sensors 24 may include standalone units positioned on or about surface 14. Sensors 24 may scan worksite 10 to gather information defining the surface 14 thereof. Specifically, sensors 24 may determine the distance and direction from sensors 24 to points on surface 14 of worksite 10. Sensors 24 may, in addition, gather other information about points on surface 14, such as, for example, a color of surface 14 at the particular location, if desired. Sensors 24 may incrementally gather the information for each of the points individually and/or as a point cluster (i.e., a "point cloud"). Operation of sensors 24 may be wirelessly controlled or programmed by controller 34 such that each of sensors 24 scans a respective portion of the worksite surface 10. Alternatively or additionally, sensors 24 may be configured to autonomously scan surface 10. The information gathered by sensors 24 about the points on surface 14 and/or any other information associated therewith will be hereinafter referred to as "points."

Sensors 24 may embody LIDAR (light detection and ranging) devices (e.g., a laser scanner), RADAR, (radio detection and ranging) devices, SONAR (sound navigation and ranging) devices, camera devices, and/or another types of devices that may determine the range and direction to objects and/or attributes thereof. Sensors 24 may communicate to controller 34 signals indicative of the range, the direction, and/or other information or attributes about the points sensed. Additional sensors 24 may be implemented to cover worksite surface 14 in a shorter period of time, if desired. For example, pairs of sensors (not shown) may be positioned about worksite 10 to stereoscopically gather points defining surface 14. In addition, sensors 24 may be mounted on one or more machines 12 equipped with GPS and/or other position- and orientation-determining means to supplement the scanning of the sensors 24 arranged about worksite 10. Any arrangement, configuration, and/or number of sensors 24 may be utilized, however, to gather points in a suitable manner.

Sensors 24 may include and/or be associated with a timing device (not shown) to compute a time location for sensor determinations. Sensors 24 may append this time location to their respective determinations. That is, sensors 24 may attach or otherwise associate with each gathered point a time at which the point was gathered. The time location may be measured relative to Greenwich Mean Time, the Julian Day, or another type of time measurement system. The timing device may embody a quartz oscillator, an electronic receiver configured to communicate with a clock system (e.g., periodically receive a corrective update from a remote source), or another device operable to receive or determine time location information.

It is to be appreciated that, during the process of scanning surface 14, sensors 24 may detect and gather points for all of features found on the worksite surface 14 within the sensors' scanned field of view, including terrain 16, objects 18, and/or any other items found thereon. That is, sensors 24 may detect and gather points that do not belong to (i.e., define) the actual terrain 16 of worksite 10, in addition to those that do belong to terrain 16. Absent further processing, filtering, and/or classification, sensors 24 alone may not be able to distinguish terrain 16 from other objects 18 found on or about surface 14.

Terrain map 32 may be a database containing previously-gathered points defining worksite surface 14. Terrain map 32 may, for example, store the previously-gathered points in a matrix form. Each point may include a location (e.g., Cartesian, polar, or spherical coordinate data) and/or other attributes (e.g., a color) about the particular point on the surface 14 of worksite 10. It is to be appreciated that as worksite 10 undergoes geographic alteration (e.g., excavation), surface 14 may change with time. Accordingly, terrain map 32 store a matrix $S^{-1}$ containing points defining the most recently scanned and stored surface 14 of worksite 10. In one embodiment, each point may have a form of $(x_m, y_m, z_m, t_m)$, where x, y, and z are the location of the particular point on the surface 14 of worksite 10 with respect to a coordinate system (e.g., coordinate system $W^0$ discussed below); t is the time location of the point; and m is a numerical identifier of the point (i.e., m may range from 1 to the total number of stored points defining surface 14). Each of the points may also include one or more attributes (e.g., a color) of the particular location on the surface 14 of worksite 10 in the form of $\alpha_m$, where $\alpha$ indicates the attribute. Terrain map 32 may store additional matrices $S^{-n}$ containing points defining other historical surfaces 14 of worksite 10, if desired. In one embodiment, the points may be previously-gathered by sensors 24. Alternatively or additionally, the points may be previously-gathered by satellite imagery, aerial mapping, surveys, and/or other terrain mapping means known in the art.

Object database 33 may contain information about at least some of objects 18. The information may embody, for example, geometric models of objects 18, such as CAD renderings or other schematic models that define the unique features of objects 18 (e.g., edges). The models may include lengths, widths, heights, and/or other dimensions that define the shape of objects 18. In addition, the models may include other, non-geometric attributes about objects 18, such as, for example, colors and identifiers (e.g., machine 12, a conveyor, or a worker 20).

In one aspect, models for worksite infrastructure, such as storage facilities, conveyors, chutes, lifts, buildings, and/or other objects 18 permanently arranged on worksite 10, may be included in object database 33. These infrastructure models may include, in addition to the information discussed above, positions and orientations of the infrastructure on worksite 10, as well as their positional relationships to one another (e.g., a three-dimensional map of the worksite infrastructure). Because of the permanent nature of worksite infrastructure, this information may be known or easily acquired (e.g., from a worksite schematic or a scan of the worksite).

In another aspect, object database 33 may also include models for objects 18 that may move about worksite 10, such as machines 12, workers 20, etc. Object database 33 may be preconfigured to include predetermined models. Alternatively or additionally, object database 33 may be updated or generated based on a scan of worksite 10, a survey of worksite 10, model uploads and/or downloads (e.g., from off-board system 36), etc.

Controller 34 may embody any processor capable of executing and/or or outputting command signals in response to received and/or stored data to affect, among other things, the terrain mapping applications disclosed herein. Controller 34 may include any means for monitoring, recording, storing, indexing, processing, and/or communicating information. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media associated with controller 34, such as computer chips and secondary storage devices, including hard disks, floppy disks, optical media, CD-ROM, or other forms of RAM or ROM.

Controller 34 may communicate with sensors 24 to receive the points gathered thereby defining surface 14; with terrain map 32, model database 33, and-or machines 12 regarding mapping determinations discussed below. This information may be stored in computer-readable media for subsequent determinations.

Controller 34 may relate, by time location, the determinations of sensors 24 and/or the determinations of other machines 12 communication with sensors 24. Controller 34 may then calculate geographical locations of points on the surface 14 of worksite 10 using the related determinations. Each geographical location may be represented by three coordinates associated with a 3-D coordinate system and a fourth coordinate representing its time location. In addition, each geographical location may be associated with other attributes about the particular point on surface 14 gathered by sensors 24, such as a color. These parameters, i.e., the four coordinates, and any other gathered attributes, may collectively represent a point defining the surface 14 at the particular location.

Figure 2:
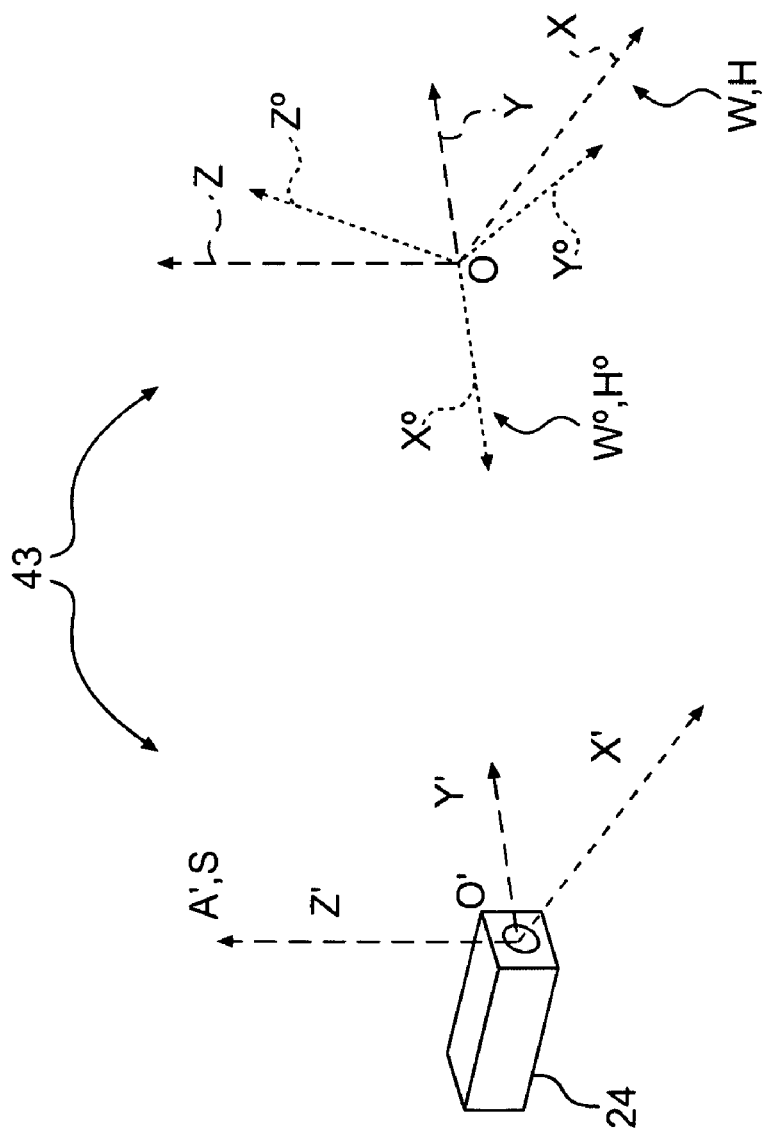
FIG. 2 is a representation of coordinate systems for use with the terrain mapping system of FIG. 1.

FIG. 2 illustrates exemplary coordinate systems 43 that may be used by controller 34. In particular, controller 34 may use a coordinate system $W^o$ when storing coordinates of points. Coordinate system $W^o$ may have its origin geographically located at point O. Coordinate system $W^o$ may be a right-handed 3-D Cartesian coordinate system having axis vectors $X^o$, $Y^o$, and $Z^o$. A point in coordinate system $W^o$ may be referenced by its coordinates in the form $W^o$ ($x^o$, $y^o$, $z^o$), where, from point O, $x^o$ is the distance along axis vector $X^o$, $Y^o$ is the distance along axis vector $Y^o$, and $z^o$ is the distance along axis vector $Z^o$. Point O may also be the origin of a coordinate system $H^o$.

Coordinate system $H^o$ may be a spherical polar coordinate system used by controller 34 to interpret determinations of sensors 24 and/or determinations of other machines 12 communication with off-board system 36. A point in coordinate system $H^o$ may be referenced by its coordinates in the form $H^o(R^o, \theta^o, \phi^o)$, where $R^o$ is the distance from point O to the referenced point, $\theta^o$ is the azimuthal angle in the $X^o$–$Y^o$ plane from the vector $X^o$ to the referenced point, and $\phi^o$ is the polar angle from vector $Z^o$ to the referenced point. Angle $\theta^o$ may range from 0 degrees to 360 degrees. Angle $\phi^o$ may range from 0 degrees to 180 degrees. Additionally, point O may be the origin of a coordinate system W.

Coordinate system W may be a right-handed 3-D Cartesian coordinate system used by controller 34 to interpret determinations of sensors 24 and/or the determinations of other machines 12 in communication with off-board system 36. Coordinate system W may have axis vectors X, Y, and Z. Coordinate system W may be related to coordinate system $W^o$ by a rotational transform. A point in coordinate system W may be referenced by its coordinates in the form W(x, y, z), where from point O, x is the distance along axis vector X, y is the distance along axis vector Y, and z is the distance along axis vector Z. Additionally, point O may be the origin of coordinate system H.

A coordinate system H may be a spherical polar coordinate system used by controller 34 to interpret determinations of sensors 24 and/or the determinations of other machines 12. A point in coordinate system H may be referenced by its coordinates in the form H (R, θ, φ), where R is the distance from point O to the referenced point, θ is the azimuthal angle in the X-Y plane from the vector X to the referenced point, and φ is the polar angle from vector Z to the referenced point. Angle θ may range from 0 degrees to 360 degrees. Angle φ may range from 0 degrees to 180 degrees.

Each of sensors 24 may be located at a respective point O'. Point O' may be the origin of a coordinate system A'. Coordinate system A' may be used by controller 34 to interpret determinations of the sensors 24. Coordinate system A' may have axis vectors X', Y', and Z'. Coordinate system A' may be related to coordinate system W by a translational transform to account for the difference in position between coordinate system A' and coordinate system W'. A point in coordinate system A' may be referenced by its coordinates in the form A'(x',y',z'), where from point O', x' is the distance along axis vector X' to the referenced point, y' is the distance along the axis vector Y' to the referenced point, and z' is the distance along axis vector Z' to the referenced point. Point O' may also be the origin of a coordinate system S.

Coordinate system S may be a spherical polar coordinate system used by sensors 24 to determine the geographical location of points on surface 14. A point in coordinate system S may be referenced by its coordinates in the form S (R',θ',φ'), where R' is the distance from point O' to the referenced point, θ' is the azimuthal angle in the X'-Y' plane from axis vector X' to the referenced point, and φ' is the polar angle from axis vector Z' to the referenced point. Angle θ' may range from negative 90 degrees to positive 90 degrees. Angle φ' may range from 0 degrees to 180 degrees.

Figure 3:
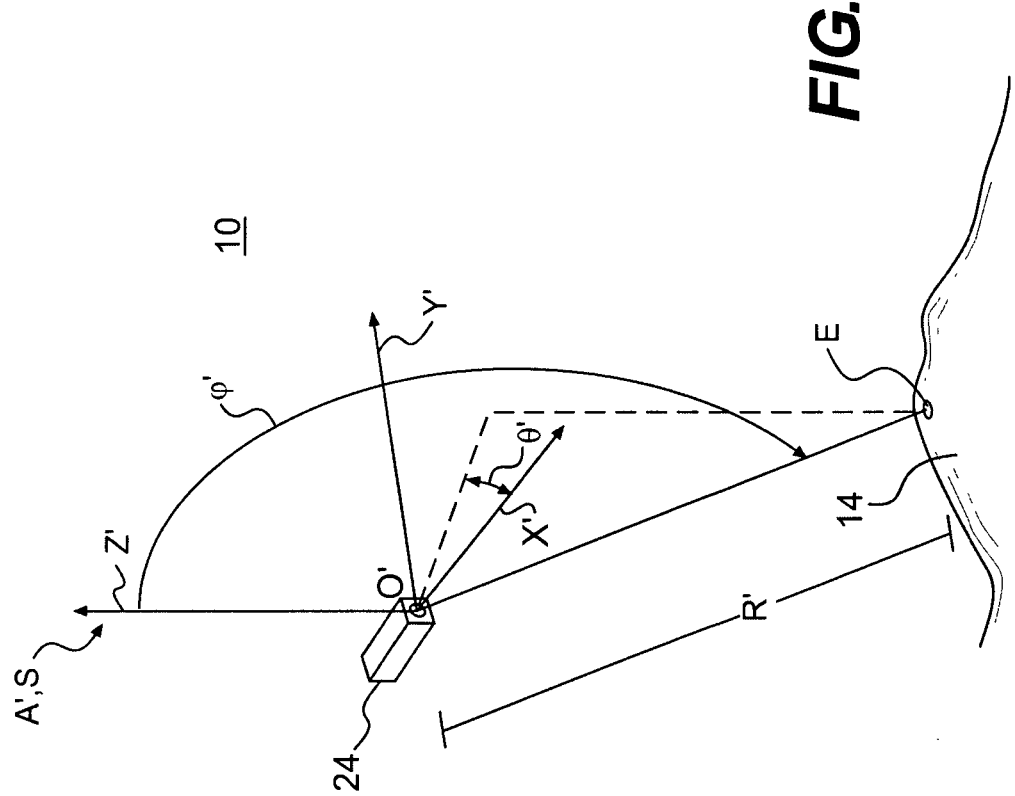
FIG. 3 is a representation of scanning of a point on the worksite surface, as related to the coordinate systems of FIG. 2.

As illustrated in FIG. 3, each of sensors 24 may use a beam pulse 44 to measure the distance between itself and a point E on surface 14. Each of sensors 24 may have an emitter (not shown), which may emit beam pulse 44 and a receiver (not shown), which may receive beam pulse 44 as reflected off of point E. Sensors 24 may measure the time between beam pulse emission and reception. This measured time may be the time beam pulse 44 took to travel to, reflect off, and return from point E. Sensors 24 may convert the measured time into a distance. This distance may be the distance R' from point E to sensors 24 in the direction of emitted beam pulse 44. Beam pulse 44 may be emitted in the direction of a fixed angle φ', and a varied angle θ'. Angle φ' may be fixed at an angle greater than 90 degrees. This angle may be great enough to enable beam pulse 44 to reflect off point E on a concave portion of surface 14 and at least a portion of beam pulse 44 to return to the receiver of sensors 24. Angle θ' may vary between, for example, negative 90 degrees and positive 90 degrees. Distance R' may be associated with angles φ' and θ' to fully define the geographical location of point E in coordinate system S. Sensors 24 may communicate a signal indicative of this geographical location to controller 34, in addition to other attributes gathered about the particular point on surface 14. Alternatively or additionally, groups of points may similarly be gathered contemporaneously as a "point cloud."

Figure 4:
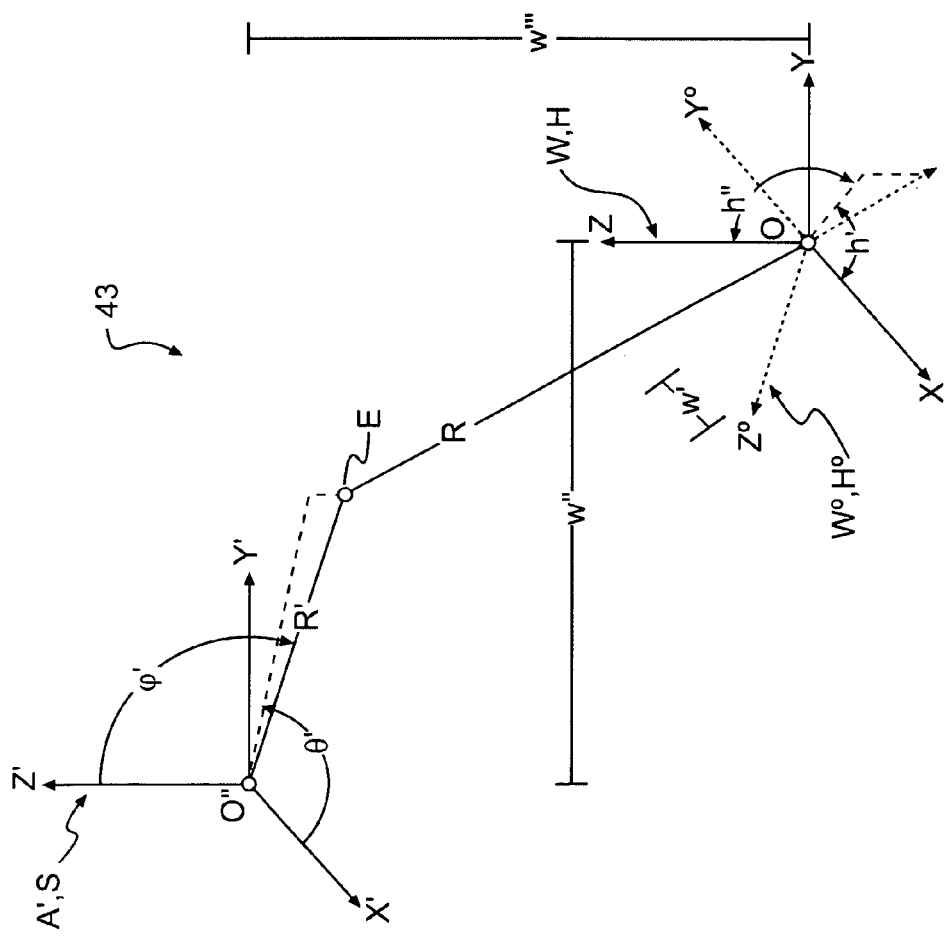
FIG. 4 is a representation of relationships between the coordinate systems of FIG. 2.

FIG. 4 illustrates relationships between coordinate systems, S, A', W, H, H⁰, and W⁰. Controller 34 may relate point E in coordinate system S to its location in other coordinate systems. In particular, controller 34 may relate point E in coordinate system S to its location in coordinate system A'. The relation between coordinate system S and coordinate system A' may be as follows:

$x^0 = R'(\cos\theta')(\sin\phi');$ $y^0 = R'(\cos\theta')(\sin\phi');$ and $z^0 = R'(\cos\phi').$ Controller 34 may further relate point E in coordinate system S to coordinate system W. The relation between coordinate system A' and coordinate system W may be as follows:

$x = x' + w';$ $y = y' + w'';$ and $z = z + + w'''.$

Controller 34 may further relate point E in coordinate system S to coordinate system H. The relation between coordinate system W and coordinate system H may be as follows:

$R = (x^2 + y^2 + z^2)^{1/2};$ $\theta = \tan^{-1}(y/x);$ and $\phi = \cos^{-1}(z/R).$ Controller 34 may further relate point E in coordinate system S to coordinate system H⁰. The relation between coordinate system H and coordinate system H⁰ may be as follows [yaw and pith):

$R^0 = R;$ $\theta^0 = \theta + h';$ and $\phi^0 = \phi + h'';$

In the formulas above, h' and h'' may be known or determined values indicating the azimuthal offset and the polar angle offset, respectively, between coordinate system S and coordinate system H⁰.

Still further, controller 34 may relate point E in coordinate system S to coordinate system W⁰. The relation between coordinate system H⁰ and coordinate system W⁰ may be as follows:

$x^0 = R^0(\cos\theta^0)(\sin\phi^0);$ $y^0 = R^0(\cos\theta^0)(\sin\phi^0)$ $z^0 = R^0(\cos\phi^0).$ Controller 34 may temporarily store the coordinate system W⁰ location of point E in a temporary map 46 contained in memory associated with controller 34 for subsequent determinations. It is to be appreciated that other methods of translating between the various coordinate systems may be employed additionally or in the alternative. For example, the translations may performed by matrix operations or other suitable methods known in the art.

Figure 5:
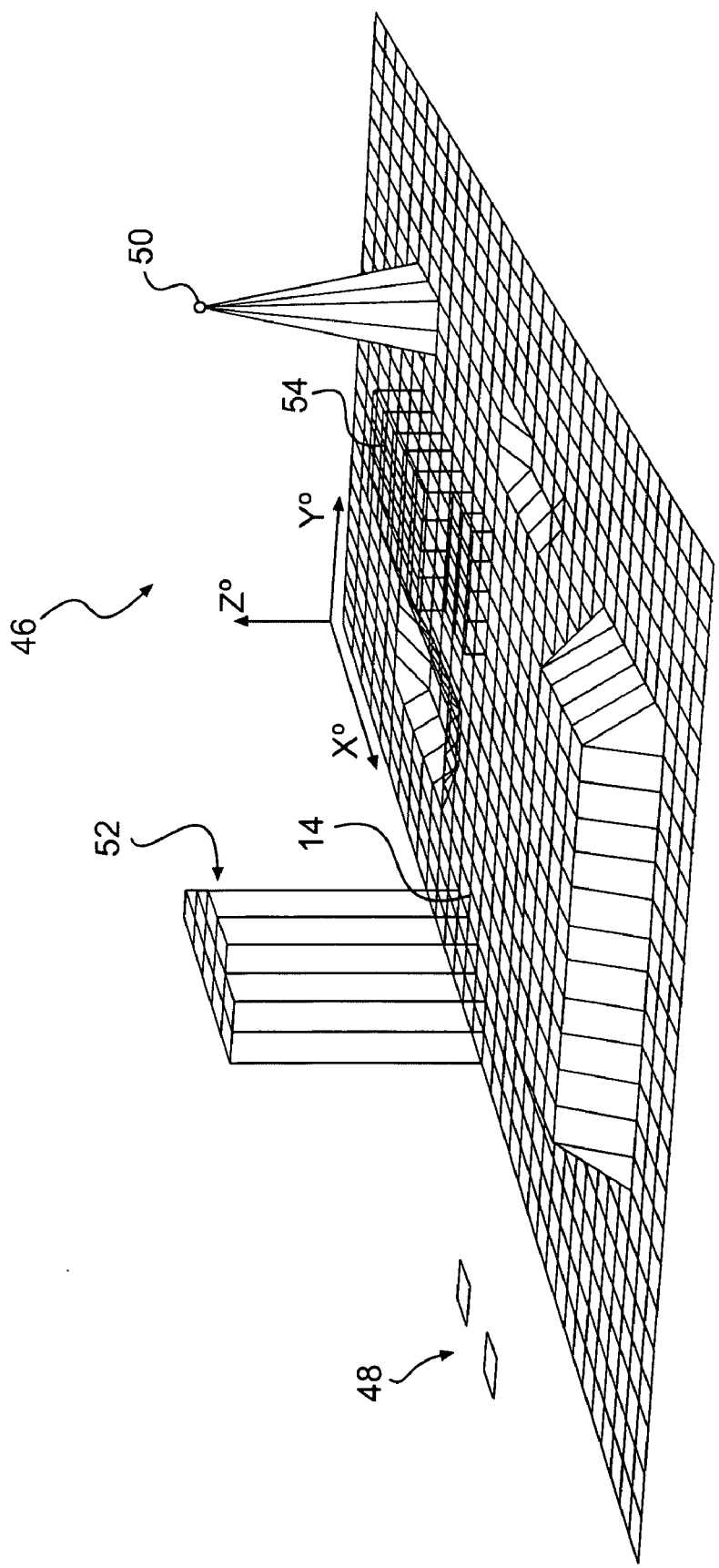
FIG. 5 is a representation of the worksite as scanned by the terrain mapping system of FIG. 1.

FIG. 5 is a graphical illustration of points on surface 14 at a time T, as they may be gathered by sensors 24 and stored in temporary map 46. It is contemplated that some of these points may not actually represent the terrain 16 of worksite 10. For example, the points may include extraneous points 48 outside the boundary of worksite 10 and/or surface 14 and an extraneous point 50 above worksite 10. Extraneous points 48, 50 may be caused by, for example, falling debris, glare from sunlight, noise, and/or anomalies that arise during scanning of worksite 10. In addition, temporary map 46 may include points 52 defining infrastructure on worksite 10, and/or points 54 defining a machine 12 on surface 14. It is to be appreciated, however, that temporary map 46 may include other points representing other objects 18 that may be found on worksite 10.

Controller 34 may filter from temporary map 46 extraneous points 48 outside the boundary of worksite surface 14. For example, controller 34 may discard all extraneous points 48 in temporary map 46 having x⁰ and y⁰ coordinates greater than or less than an X⁰ and Y⁰ maximum or minimum threshold, respectively (i.e., x⁰ and y⁰ coordinates outside a range).

Likewise, controller 34 may filter from temporary map 46 extraneous point 50 using a height (Z⁰ coordinate) threshold (i.e., discard extraneous point 50). A straight height threshold may be meaningless since surface 14 may not be flat. As such, the Z⁰ threshold may be referenced against an expected height, as predicted by third order fits along vectors parallel to axis vectors X⁰ and Y⁰, at the x⁰ and y⁰ coordinates, respectively, of each point. In this manner, points on a hill of surface 14 may be retained in temporary map 46 since the actual height and the height expectation thereof, as predicted by the third order fits should match very closely. Extraneous point 50 may be removed from temporary map 46 and replaced by the height expectation, since its actual height may not reflect the height expectation (e.g., falling debris), as predicted by the third order fits. In other words, controller 34 may discard extraneous point 50 and replace extraneous point 50 with an interpolation based on surrounding points.

Controller 34 may also analyze temporary map 46 to identify objects 18 on worksite 10 that do not belong to terrain 16. Controller 34 may filter and/or discard points corresponding to these detected objects 18. Continuing with the example shown in FIG. 5, controller 34 may analyze temporary map 46 to identify and remove points 52 defining infrastructure on worksite 10 and points 54 defining a machine 12 worksite 10. It is to be appreciated, however, that controller 34 may be configured to detect and remove from temporary map 46 any objects 18 that might be found on a worksite 10.

In one aspect, controller 34 may identify discontinuities in temporary map 46 caused by points 52, 54 to detect and remove points 52, 54 caused by objects 18 on worksite 10. That is, controller 34 may detect abrupt changes in height (i.e., z⁰ coordinates) between adjacent or proximate points (hereinafter "discontinuities"). The discontinuities may indicate the edges of objects 18 and/or boundaries between terrain 16 and objects 18. In addition, controller 34 may determine or approximate positions and orientations of associated collections of proximate edges and surfaces defined thereby (hereinafter "collections") to identify or classify objects 18 present on surface 14. That is, controller 34 may identify the collections defined by points 52, 54. For example, controller 34 may compare the collections defined by points 52, 54 in temporary map 46 to the models contained object database 33. Controller 34 may identify the shapes and orientations of the collections, relate the identified shapes and orientations of the collections to the models in model database, and determine correlations therebetween. If correlations are found, controller 34 may identify and/or classify points 52, 54 as objects 18, and remove points 52, 54 from temporary map 46. It is contemplated, however, that controller 34 may remove points 52, 54 from temporary map 46 regardless of whether they can be specifically identified or classified using object database 33. In other words, collections may be removed even if they do not correspond to models in object database 33.

Controller 34 may detect and remove points 52, 54 based on an expected angle of repose stored in memory or otherwise available or determined. The angle of repose is the maximum slope at which loose material, such as, for example, coal or earth, will remain in place without sliding. Thus, areas on surface 14 having a slope greater than an expected angle of repose may correspond to objects 18 on surface 14. Accordingly, controller 34 may utilize the position information (i.e., $x^0$, $y^0$, and $z^0$ coordinates) of the points contained in temporary map 46 to calculate the gradient (i.e., the slope and the direction thereof) at $x^0$ locations of surface 14. Controller 34 may calculate the gradient of surface 14 at any resolution necessary to define the slope of surface 14 with a suitable degree of accuracy and/or precision. Controller 34 may then filter from temporary map 46 any points having a gradient magnitude greater than the expected angle of repose. In addition, controller 34 may filter from temporary map 46 any points encompassed or surrounded by points having a gradient magnitude greater than the expected angle of repose (i.e., having $x^0$ and $y^0$ coordinates within a perimeter defined by the outer points having a gradient magnitude greater than the expected angle of repose). It is to be appreciated that such points (i.e., points surrounded by points having a gradient magnitude greater than the expected angle of repose) may represent points on an object 18. For example, a large crate may be on surface 14. The points corresponding to the vertical walls of the crate may define gradients having magnitudes greater than the expected angle of repose. The points corresponding to the horizontal top of the crate, however, may have gradients magnitudes of zero or otherwise less than the expected angle of repose, and may be surrounded by the vertical wall points with respect to the respective $x^0$ and $y^0$ coordinates. All of these points define the crate and ought to be filtered from temporary map 46. As such, controller 34 may filter points having a gradient magnitude greater than the expected angle of repose, as well as points surrounded thereby with respect to $x^0$ and $y^0$ coordinates.

In another aspect, controller 34 may detect and remove points 52 defining infrastructure on worksite 10 based solely on the models contained model database 33. For example, controller 34 may remove from temporary map 46 all points 52 having $x^0$ and $y^0$ coordinates corresponding to those defined by infrastructure models contained in model database 33. As mentioned above, these points defining infrastructure may be previously-determined and stored in database 33 as models.

In yet another aspect, the classification, identification, and/or removal of points 54 (i.e., machines 12) may be supplemented by information received from machines 12 or other communication-capable objects on worksite 10. For example, controller 34 may determine time locations and time orientations (i.e., a location, inclination, and heading at a particular time) of the collections, and compare determined time locations and time orientations to position, orientation, and/or time information received from machines 12 on worksite 10. If the determined time location and/or time orientation of a collection corresponds to the position, orientation, and/or time information received from any one of machines 12, controller 34 may remove from temporary map 46 points 54 corresponding to the collection. In other words, points 54 may be removed if controller 34 determines that machine 12 was at or near the locations of points 54 at time T, and that points 54 define the shape and/or orientation of machine 12.

Alternatively or additionally, controller 34 may select appropriate models from object database 33 based on identification information received from machines 12 and overlay the models on temporary map 46 at the time location and time orientation received from machines 12 at time T. Controller 34 may then discard all points 54 encompassed by (i.e., fall within) the model.

Controller 34 may also remove points 52, 54 based one or more attributes, such as color. For example, controller 34 may remove from temporary map 46 points 52, 54 having a yellow color attribute (i.e., a machine 12) or another color attribute that does not correspond to terrain 16. Removal of points 52, 54 based on attributes may be incorporated into any of the methods discussed above, if desired. For example, color, in addition to geometry, position, orientation, etc., may be used to identify points 52, 54 corresponding to objects 18 on surface 14.

As discussed above with respect to extraneous point 48, points 54 removed from temporary map 46 may be replaced with an expected or interpolated height (i.e., an expected $z^0$ coordinate) at the particular $x^0$ and $y^0$ location, because terrain 16 may still be present beneath machines 12. Conversely, points 52 known to represent infrastructure on worksite 10 may not be replaced, as no usable terrain 16 may be available at these locations.

Figure 6:
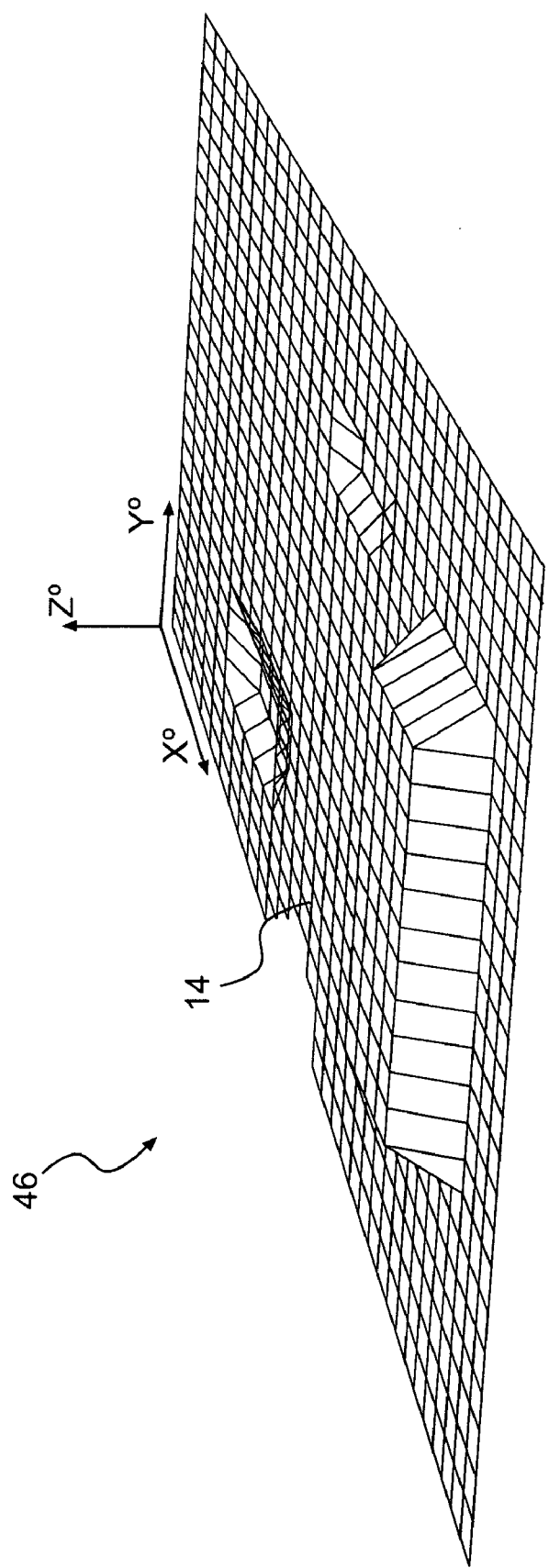
FIG. 6 is a representation of the worksite surface scan of FIG. 5, as refined by the terrain mapping system of FIG. 1.
Figure 7:
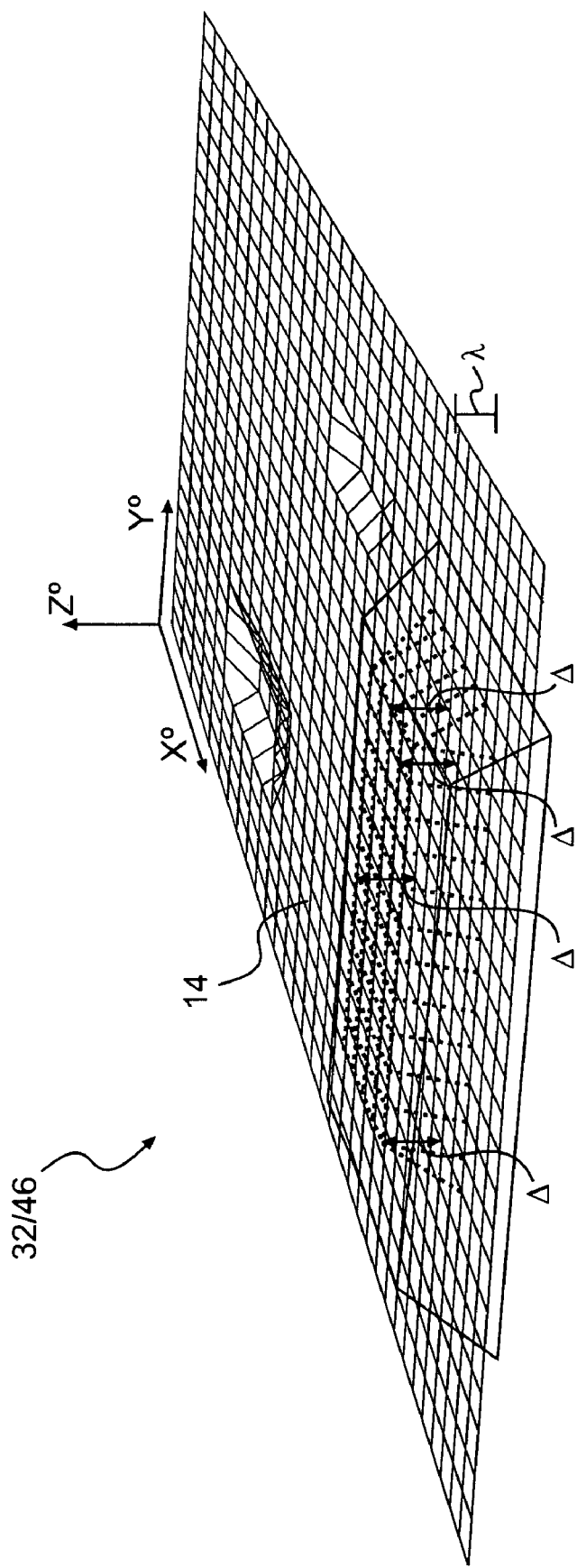
FIG. 7 is a representation of the refined worksite surface scan of FIG. 6 compared with a previous surface of the worksite.

FIG. 6 shows an exemplary graphical illustration of points on the surface 14 of worksite 10 at time T as they may be stored in temporary map 46, after the filtering discussed above is performed (i.e., the most recently-gathered points defining actual terrain 16). FIG. 7 shows an exemplary graphical illustration of points representing the surface 14 of worksite 10 at a time t (prior to T), as they may be stored in terrain map 32 (i.e., previously gathered points defining the previous surface of worksite 10) superimposed on the points defining surface 14 as they may be stored in temporary map 46.

Controller 34 may compare the newly-gathered points stored in temporary map 46 to corresponding previously-gathered points contained in terrain map 32 (i.e., the previously-mapped surface). Controller 34 may determine whether an update to terrain map 32 is warranted based on the comparison. In particular, controller 34 may compare the heights of points stored in temporary map 46 to the heights of corresponding points stored in terrain map 32. FIG. 7 shows a graphical illustration of the height differences Δ between terrain map 32 and temporary map 46 at each $x^0$–$y^0$ coordinate pair. Each height difference Δ may or may not warrant an update to terrain map 32. It is to be appreciated that height differences Δ (positive or negative) below a certain height magnitude threshold λ may not warrant an update to terrain map 32. For example, if a small amount of material is removed from or added to a location on the surface 14 of worksite 10 that causes a change in height Δ of only a few centimeters, an update to terrain map 32 is probably not warranted. Updating terrain map 32 in such instances may, for example, impose an undue processing burden on system 22. Conversely, changes of height Δ greater than a few centimeters, or another magnitude λ indicative of a significant change to the worksite terrain 16, may warrant an update to terrain map 32. As such, controller 34 may have a stored value for magnitude threshold λ. The value may be preset based on the particular application or configurable to allow a user of system 22 to adjust the mapping sensitivity of system 22.

In this manner, height differences Δ that are greater (or equal to) in magnitude than λ may be incorporated into terrain map 32. That is, terrain map 32 may be updated to reflect height changes greater in magnitude than λ. Specifically, controller 34 may replace each terrain map point associated with a height difference greater in magnitude than λ with its corresponding temporary map 46 point, thereby updating terrain map 32 to reflect the surface 14 of worksite 10 at time T. Conversely, height differences Δ that are less in magnitude than λ may be not be incorporated into terrain map 32. That is, controller 34 may not update terrain map 32 to reflect height differences Δ that are less than height λ in magnitude. One of skill in the art will appreciate that, in this manner, terrain map 32 may only be updated to reflect substantial and/or significant changes to the surface 14 of worksite 10. In this manner, computing resources of system 22 may be conserved, because controller 34 may not redundantly update terrain map 32 to reflect terrain 16 that has substantially the same height from one scan to the next.

Returning to FIG. 1, off-board system 36 may represent one or more computing systems of a business entity associated with machine 12, such as a manufacturer, dealer, retailer, owner, or any other entity that generates, maintains, sends, and/or receives information associated with the operation of one or more of machines 12. The one or more computing systems may include, for example, a laptop computer, a work station, a personal digital assistant, a mainframe, and other computing systems known in the art. The computing systems may include any means for monitoring, recording, storing, indexing, processing, and/or communicating information. These means may include a central processing unit (CPU); random access memory (RAM); read-only memory (ROM); secondary storage devices, including hard disks, floppy disks, optical media, CD-ROM; a user interface; a network interface. It is contemplated, however, that off-board system 36 may include additional, fewer, and/or different components than those listed above.

Industrial Applicability

Figure 8:
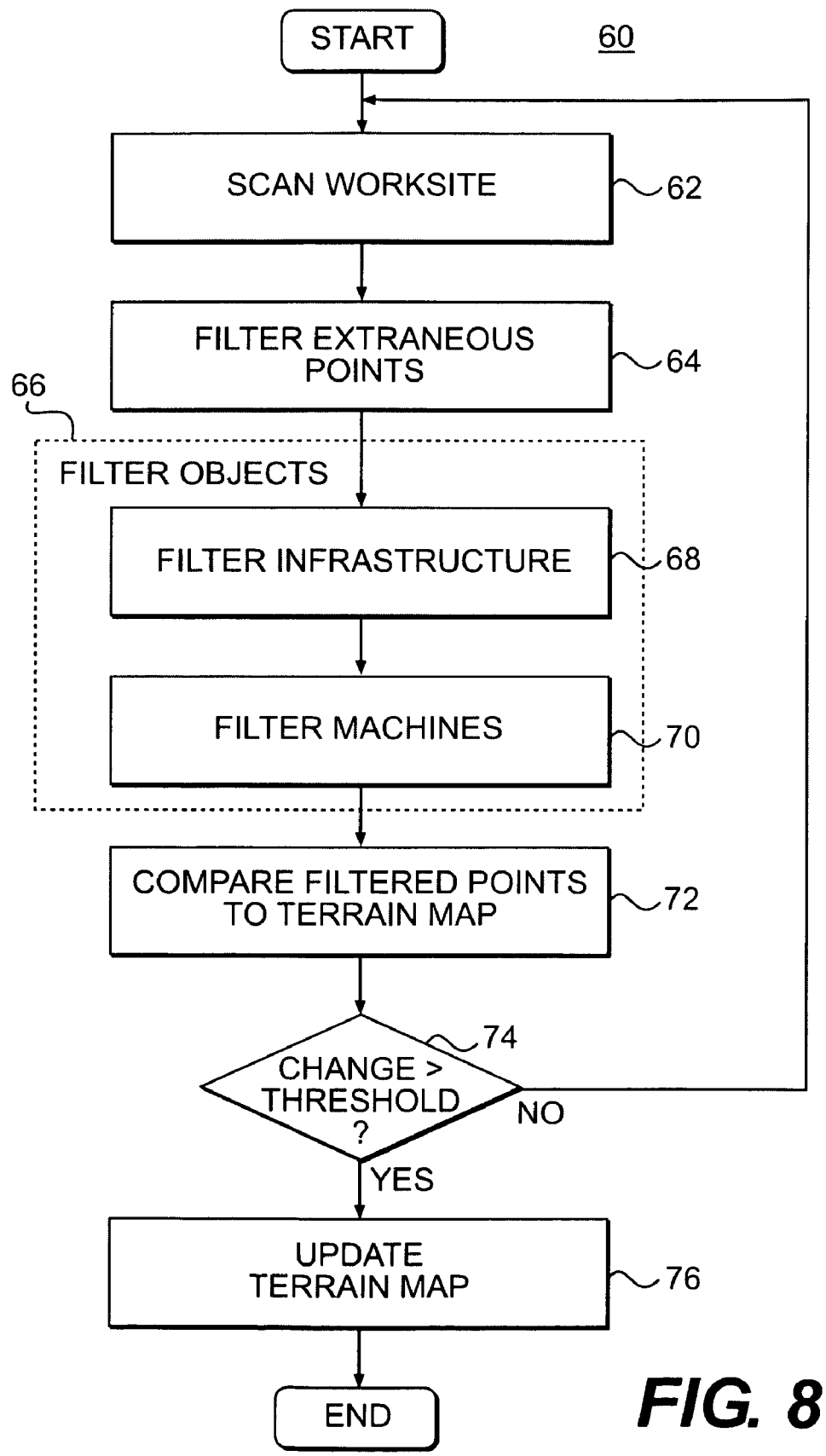
FIG. 8 is a flowchart illustrating exemplary operation of the terrain mapping system of FIG. 1.

The disclosed system may be useful for terrain mapping tasks. In particular, the system may detect and remove objects that are not part of the terrain. The terrain map thus created may be more useful in applications such as, for example, remotely aiding or controlling excavation, determining progress towards completion of tasks, calculating material ingress and egress, identifying worksite inefficiencies or trends, and/or any other applications in which an accurate terrain map excluding objects on the surface of the site that may have been scanned during the mapping process is desired. In addition, because the terrain map may only be updated to reflect terrain height changes greater in magnitude than a configurable threshold λ, computing resources may be conserved. With reference to FIG. 8, operation 60 of system 22 will now be described.

Initially, system 22 may scan worksite 10 (step 62), as described above. That is, one or more sensors 24 mounted on one or more machines 12 and/or at a known location on worksite 10, may gather points defining a surface 14 of worksite 10. The gathered points may be communicated to controller 34. The gathered points may be stored in temporary map 46 for further processing, as discussed above.

Concurrently with or subsequent to the scanning of step 62, controller 34 may filter extraneous points from temporary map 46 (step 64). For example, controller 34 may remove from terrain map 46 extraneous points 48 outside a worksite boundary and/or points 50 above worksite 10, and/or points caused by anomalies, as discussed above.

Controller 34 may then filter from temporary map 46 points defining objects 18 on surface 14 (step 66). Step 66 may include filtering points 52 corresponding to infrastructure on worksite 10 (step 68) and points 54 corresponding to machines 12 on surface 14 (step 70), and/or any other objects 18 not part of terrain 16, as discussed above. In addition, step 66 may include filtering any other objects 18 found on surface 14.

Upon completion of step 66, controller 34 may compare the points remaining in the filtered terrain map 46 to corresponding previously-scanned and stored points defining a previous surface 14 (e.g., the most recently scanned and stored surface) contained in terrain map 32 (step 72). Specifically, controller 34 may compare height differences between terrain map 32 and temporary map 46 at $x^0$-$y^0$ coordinate pairs.

Controller 34 may then determine if a change to terrain map 32 is warranted based on the comparison in step 72 (step 74). Specifically, controller 34 determine if height differences between terrain map 32 and temporary map 46 at $x^0$-$y^0$ coordinate pairs are greater in magnitude than a height magnitude threshold λ. As mentioned above, the threshold λ may be fixed and/or configurable by a user of system 22 allow changes in mapping sensitivity of system 22.

In one example, controller 34 may determine in step 74 that the height differences at one or more $x^0$-$y^0$ pairs (i.e., one or more locations on the surface 14 of worksite 10) have a magnitudes less than threshold A. For instance, these portions of the worksite surface 14 may not have been substantially geographically altered since the previous scan of worksite 10, and the height differences may be less than the threshold A (i.e., the heights have changed by less than λ since a prior scan of worksite 10). In this case, controller 34 may discard these points and return to step 62.

In another example, controller 34 may determine in step 74 that the height differences at one or more $x^0$-$y^0$ coordinate pairs (i.e., one or more locations on the surface 14 of worksite 10) are greater than the threshold λ. For instance, these portions of the worksite surface 14 may have been geographically altered by workers 20 and/or machines 12 digging a foundation for a building to be constructed. As such, the height differences between the corresponding $x^0$-$y^0$ coordinate pairs may be greater in magnitude than A (i.e., the heights have changed by more than λ since a prior scan of worksite 10. In this case, controller 34 may update terrain map 32 (step 76). In particular, controller 34 may replace each terrain map point associated with a height difference greater in magnitude than height λ with its corresponding temporary map 46 point, as described above.

By employing the disclosed methods and systems, a terrain map excluding objects on the worksite surface may be created, even if the worksite is scanned while being worked on by machines and/or workers. In addition, the terrain map may only be updated with newly-gathered points when at least one point on the terrain surface changes in height by more than a height magnitude threshold λ. Otherwise, the newly-gathered points may be discarded. In this manner, the terrain surface may not be redundantly mapped and computing resources may be conserved.

It will be apparent to those skilled in the art that the processes illustrated in this description may be implemented in a variety of ways and include other modules, programs, applications, scripts, processes, threads, or code sections that may all functionally interrelate with each other to accomplish the individual tasks described above for each module, script, and daemon. For example, these program modules may be implemented using commercially available software tools, using custom object-oriented code written in the C++™ programming language or the Visual Basic™ programming language; using applets written in the Java™ programming language; or may be implemented with discrete electrical components or as one or more hardwired application specific integrated circuits (ASIC) that are custom designed for this purpose.

The described implementation may include a particular network configuration but embodiments of the present disclosure may be implemented in a variety of data communication network environments using software, hardware, or a combination of hardware and software to provide the processing functions.

It will be apparent to those skilled in the art that various modifications and variations can be made to the method and system of the present disclosure. Other embodiments of the disclosed methods and systems will be apparent to those skilled in the art upon consideration of the specification and practice of the disclosure. It is intended that the specification be considered exemplary only, with a true scope of the disclosure being indicated by the following claims and their equivalents.

What is claimed is:

1. A terrain mapping system, comprising:
   at least one sensor configured to gather a plurality of current points defining a surface of a site at a time t;
   a database containing a plurality of previously-gathered points defining the surface of the site at a time T prior to t;
   a controller in communication with the at least one sensor, the controller being configured to:
   receive time-location information indicating the time-location of one or more machines operating on the site;
   identify one or more points of the plurality of current points defining the surface of the site at the time t that correspond to the received time-location information of the one or more machines operating on the site;
   filter the identified one or more points from the plurality of current points defining the surface of the site at the time t;
   compare a characteristic of at least one of the filtered plurality of points defining the surface of the site at the time t to a characteristic of a corresponding at least one of the plurality of previously-gathered points defining the surface of the site at the time T prior to t;
   determine if an update to the database is warranted based on the comparison; and
   update the database based on the at least one of the filtered plurality of points defining the surface of the site at the time t if it is determined that an update is warranted.

2. The system of claim 1, wherein:
   the characteristic is a height;
   comparing includes calculating a difference in the height between the at least one of the filtered plurality of points defining the surface of the site at the time t and the height of the corresponding at least one of the plurality of previously-gathered points defining the surface of the site at the time T prior to t to a threshold,
   determining if an update to the database is warranted includes determining if a magnitude of the difference in the height is greater than or equal to the threshold, and
   the controller is configured to determine that an update to the database is warranted if the magnitude of the difference in the height is greater than or equal to the threshold.

3. The system of claim 1, wherein the controller is further configured to discard the at least one of the filtered plurality of points defining the surface of the site at the time t when it is determined that an update to the database is not warranted.

4. The system of claim 1, wherein updating the database includes replacing the at least one of the plurality of previously-gathered points defining the surface of the site at the time T prior to t with the at least one of the filtered plurality of points defining the surface of the site at the time t.

5. The system of claim 1, wherein the at least one sensor is positioned at a known location with respect to the site.

6. A computer-implemented terrain mapping method, comprising:
   gathering a plurality of current points defining a surface of a site at a time t;
   accessing a database of a corresponding plurality of points defining the surface of the site at a time T prior to t;
   receiving time-location information indicating the time-location of one or more machines operating on the site;
   identifying one or more points of the plurality of current points defining the surface of the site at the time t that correspond to the received time-location information of the one or more machines operating on the site;
   filtering the identified one or more points from the plurality of current points defining the surface of the site at the time t;
   comparing a characteristic of at least one of the filtered plurality of points defining the surface of the site at the time t to a characteristic of a corresponding at least one of a plurality of previously-gathered points defining the surface of the site at the time T prior to t;
   determining, based on the comparison, whether a difference in the characteristic of the at least one of the filtered plurality of points defining the surface of the site at the time t and the characteristic of the at least one of the plurality of previously-gathered points defining the surface of the site at the time T prior to t is greater than a threshold; and
   updating the database with the at least one of the filtered plurality of points defining the surface of the site at the time t based on a determination that the difference in the characteristic is greater than the threshold.

7. The method of claim 6, further including discarding the at least one of the filtered plurality of points defining the surface of the site at the time t based on a determination that the difference in the characteristic is not greater than the threshold.

8. The method of claim 6, wherein updating the database includes replacing the at least one of the plurality of previously-gathered points defining the surface of the site at the time T prior to t with the at least one of the filtered plurality of points defining the surface of the site at the time t.

9. The method of claim 6, wherein the plurality of points defining the surface of the site at the time t are gathered by at least one sensor positioned at a known location with respect to the site.

10. A terrain mapping system, comprising:
    at least one sensor configured to gather a plurality of current points defining a surface of a site at a time t;
    a database containing a corresponding plurality of points defining the surface of the site at a time T prior to t; and
    a controller configured to:
    receive time-location information indicating the time-location of one or more machines operating on the site;
    identify one or more points of the plurality of current points defining the surface of the site at the time t that correspond to the received time-location information of the one or more machines operating on the site;

filter the identified one or more points from the plurality of current points defining the surface of the site at the time t;

compare a characteristic of at least one of the filtered plurality points defining the surface of the site at the time t to a characteristic of a corresponding at least one of a plurality of previously-gathered points defining the surface of the site at the time T prior to t;

determine, based on the comparison, whether a difference in the characteristic of the at least one of the filtered plurality of points defining the surface of the site at the time t and the characteristic of the at least one of the plurality of previously-gathered points defining the surface of the site at the time T prior to t is greater than a threshold; and update the database with the at least one of the filtered plurality of points defining the surface of the site at the time t based on a determination that the difference in the characteristic is greater than the threshold.

11. The system of claim 10, the controller being further configured to discard the at least one of the filtered plurality of points defining the surface of the site at the time t in response to a determination that the difference in the characteristic is not greater than the threshold.

12. The system of claim 10, wherein the controller is configured to update the database by replacing the at least one of the plurality of previously-gathered points defining the surface of the site at the time T prior to t with the at least one of the filtered plurality of points defining the surface of the site at the time t.

13. The system of claim 10, wherein the at least one sensor is positioned at a known location with respect to the site.

14. The terrain mapping system of claim 1, wherein the compared characteristic is a height.

15. The terrain mapping system of claim 1, wherein the compared characteristic is a color.

16. The terrain mapping system of claim 1, wherein the compared characteristic is an angle of repose associated with the site.

17. The terrain mapping system of claim 1, wherein the database further contains one or more geometric models associated with the one or more machines operating on the site, and the controller is configured to identify the one or more points of the plurality of current points defining the surface of the site at the time t that correspond to the received time-location information based further on the one or more geometric models.

18. The method of claim 6, wherein the compared characteristic is a height.

19. The method of claim 6, wherein the compared characteristic is a color.

20. The method of claim 6, wherein the compared characteristic is an angle of repose associated with the site.

21. The method of claim 6, wherein the database contains one or more geometric models associated with the one or more machines operating on the site, and the method further includes identifying the one or more points of the plurality of current points defining the surface of the site at the time t that correspond to the received time-location information based further on the one or more geometric models.

22. The terrain mapping system of claim 10, wherein the compared characteristic is a height.

23. The terrain mapping system of claim 10, wherein the compared characteristic is a color.

24. The terrain mapping system of claim 10, wherein the compared characteristic is an angle of repose associated with the site.

25. The terrain mapping system of claim 10, wherein the database further contains one or more geometric models associated with the one or more machines operating on the site, and the controller is configured to identify the one or more points of the plurality of current points defining the surface of the site at the time t that correspond to the received time-location information based further on the one or more geometric models.

* * * * *